(12) United States Patent
Tominaga et al.

(10) Patent No.: US 11,938,607 B2
(45) Date of Patent: Mar. 26, 2024

(54) POWER TOOL WITH LIGHT EMITTER

(71) Applicant: Makita Corporation, Anjo (JP)

(72) Inventors: Kenta Tominaga, Anjo (JP); Atsushi Murata, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/800,047

(22) PCT Filed: Dec. 14, 2020

(86) PCT No.: PCT/JP2020/046473
§ 371 (c)(1),
(2) Date: Aug. 16, 2022

(87) PCT Pub. No.: WO2021/166392
PCT Pub. Date: Aug. 26, 2021

(65) Prior Publication Data
US 2023/0073057 A1    Mar. 9, 2023

(30) Foreign Application Priority Data
Feb. 17, 2020 (JP) .................................. 2020-024619

(51) Int. Cl.
  *B25F 5/00* (2006.01)
  *B23D 45/04* (2006.01)
  (Continued)

(52) U.S. Cl.
  CPC ................ *B25F 5/00* (2013.01); *B23D 45/04* (2013.01); *B25F 5/021* (2013.01); *B25B 23/18* (2013.01);
  (Continued)

(58) Field of Classification Search
  CPC ............... Y10T 83/828; F21V 33/0084; B23Q 17/2404; B25B 23/18
  See application file for complete search history.

(56) References Cited

U.S. PATENT DOCUMENTS 4,833,782 A * 5/1989 Smith .................. B23D 59/003
                                                                83/520
8,418,778 B2 * 4/2013 Eshleman ............... B25B 21/00
                                                                173/183
(Continued)

FOREIGN PATENT DOCUMENTS

JP   2003-039401 A   2/2003
JP   2003-089101 A   3/2003
(Continued)

OTHER PUBLICATIONS

International Search Report of PCT/JP2020/046473 dated Feb. 2, 2021 [PCT/ISA/210].
(Continued)

*Primary Examiner* — Alexander K Garlen
(74) *Attorney, Agent, or Firm* — Sughrue Mion, PLLC

(57) ABSTRACT

A working machine includes a working part; a motor configured to drive the working part; a motor housing covering at least a part of the motor; an outer housing covering at least a part of the motor and at least a part of the motor housing; and a light emitter disposed at a part of the motor housing that is covered by the outer housing. The outer housing includes an opening at a part of the outer housing that faces the light emitter. The opening allows light emitted from the light emitter to pass through the opening.

6 Claims, 8 Drawing Sheets

(51) Int. Cl.
  *B25F 5/02* (2006.01)
  *B25B 23/18* (2006.01)
  *F21V 33/00* (2006.01)

(52) U.S. Cl.
  CPC ......... *F21V 33/0084* (2013.01); *Y10T 83/828* (2015.04)

(56) References Cited

U.S. PATENT DOCUMENTS

| | | | | |
|---|---|---|---|---|
| 8,714,765 | B2* | 5/2014 | Miyazawa | B25F 5/021 362/120 |
| 9,266,230 | B2* | 2/2016 | Maddilate | B25F 5/02 |
| 10,799,997 | B2* | 10/2020 | Schadow | B25F 5/02 |
| 2003/0024368 | A1 | 2/2003 | Fukuoka | |
| 2011/0170312 | A1* | 7/2011 | Parrinello | G02B 6/0005 362/577 |
| 2016/0131353 | A1* | 5/2016 | Bartoszek | B25F 5/008 362/119 |
| 2018/0161891 | A1 | 6/2018 | Nishikawa | |
| 2019/0001457 | A1* | 1/2019 | Ely | B25F 5/00 |
| 2019/0262916 | A1 | 8/2019 | Nishikawa | |
| 2020/0262037 | A1* | 8/2020 | Schneider | B25B 21/026 |
| 2021/0122017 | A1* | 4/2021 | Kelly | H05B 47/16 |

FOREIGN PATENT DOCUMENTS

| | | |
|---|---|---|
| JP | 2008-018498 A | 1/2008 |
| WO | 2016/194536 A1 | 12/2016 |

OTHER PUBLICATIONS

Translation of Written Opinion of the International Searching Authority dated Feb. 2, 2021 in International Application No. PCT/JP2020/046473.

Japanese Office Action dated Jan. 16, 2024 in Japanese Application No. 2020-024619.

* cited by examiner (Second Embodiment)

FIG. 7 (Second Embodiment)

(Second Embodiment)

POWER TOOL WITH LIGHT EMITTER

CROSS REFERENCE TO RELATED APPLICATIONS

This application is a National Stage of International Application No. PCT/JP2020/046473 filed on Dec. 14, 2020, claiming priority based on Japanese Patent Application No. 2020-024619 filed on Feb. 17, 2020.

TECHNICAL FIELD

The art disclosed herein relates to a working machine.

BACKGROUND ART

Japanese Patent Application Publication No. 2003-89101 describes a working machine comprising a working part; a motor configured to drive the working part; a motor housing supporting the motor; an outer housing; and a light emitter disposed at the outer housing.

SUMMARY OF INVENTION

Technical Problem in the case of disposing a light emitter at an outer housing, places at which the light emitter can be disposed may be limited due to the shape of the outer housing, etc. That is, the light emitter may not be disposed at a suitable position at the outer housing. The disclosure herein provides art that can enhance the degree of freedom for a layout of a light emitter in a working machine.

Solution to Technical Problem

A working machine disclosed herein may comprise a working part; a motor configured to drive the working part; a motor housing covering at least a part of the motor; an outer housing covering at least a part of the motor and at least a part of the motor housing; and a light emitter disposed at a part of the motor housing that is covered by the outer housing. The outer housing may comprise an opening at a part of the outer housing that faces the light emitter, wherein the opening allows light emitted from the light emitter to pass through the opening.

According to the configuration above, the light emitter is disposed at the motor housing instead of being disposed at the outer housing. Hence, even in cases where disposing the light emitter at the outer housing is limited, the light emitter can be disposed at a suitable position. Consequently, in the working machine, the degree of freedom for a layout of the light emitter can be enhanced.

DESCRIPTION OF EMBODIMENTS

In one or more embodiments, a covering member is disposed at the opening, and the covering member covers the opening and allows the light emitted from the light emitter to pass through the covering member.

According to the configuration above, extraneous matters are prevented from passing through the opening of the outer housing. Consequently, intrusion of extraneous matters into the outer housing can be prevented.

In one or more embodiments, the light emitted from the light emitter may be emitted toward the working part.

It is desirable for an operator to be able to know the state of the working part while the working part is being driven. According to the configuration above, the operator is able to properly know the state of the working part owing to the light emitted from the light emitter.

In one or more embodiments, the working machine may further comprise a battery detachably attached to the outer housing; The motor and the light emitter may be configured to operate with electric power supplied from the battery.

According to the configuration above, the working machine may not have a power cable, etc. to receive electric power from an external. Hence, the power cable will not be an obstruction while the operator is using the working machine. Consequently, the operational convenience can be enhanced.

In one or more embodiments, the working machine may further comprise a controller unit configured to control operations of the motor and the light emitter.

Generally, the operations of motors are controlled by controller units. According to the configuration above, the operation of the light emitter can be properly controlled by using the controller unit that controls the operation of the motor.

First Embodiment

Figure 1:
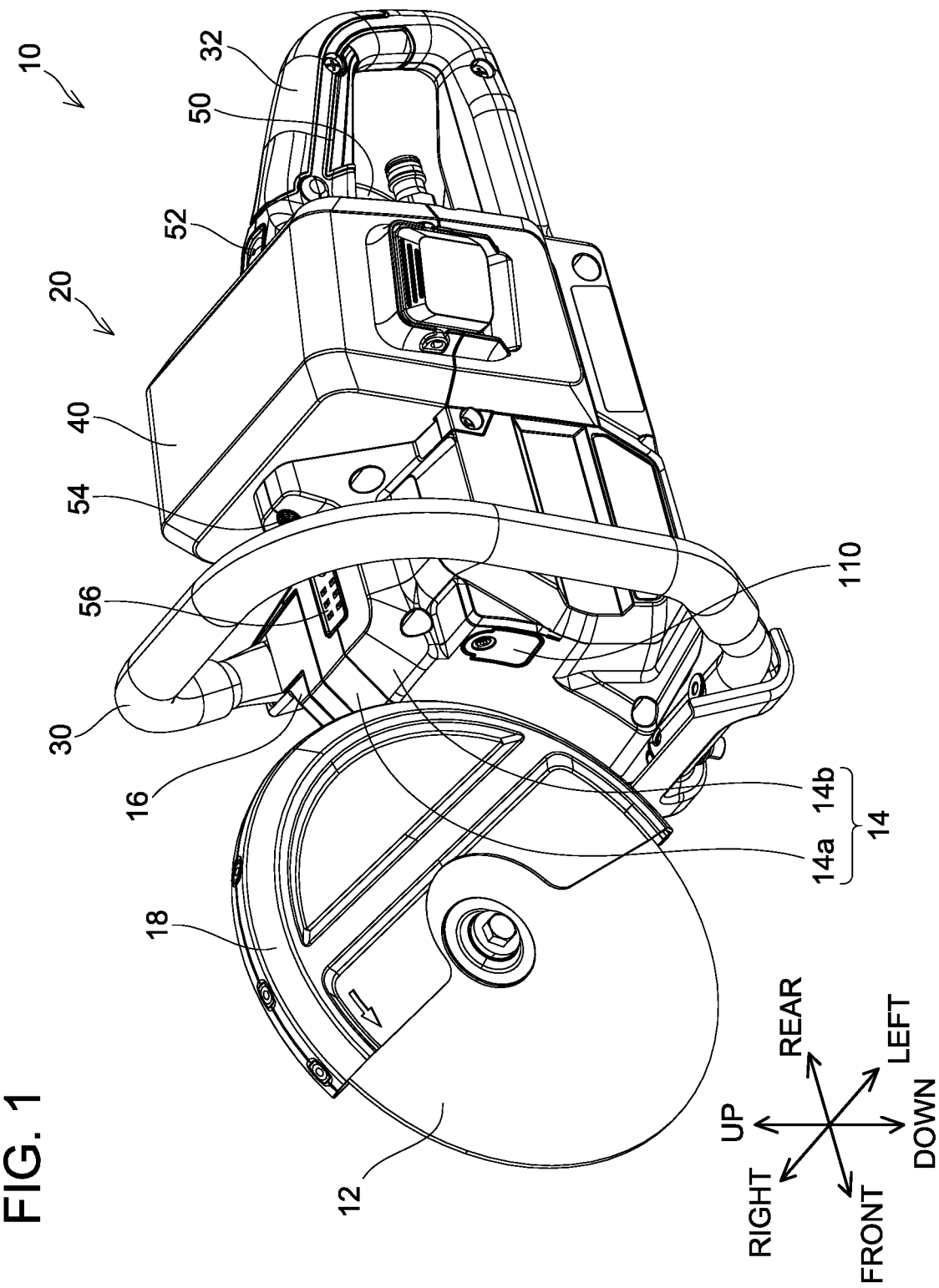
FIG. 1 is a perspective view of a power cutter 10 of a first embodiment.
Figure 2:
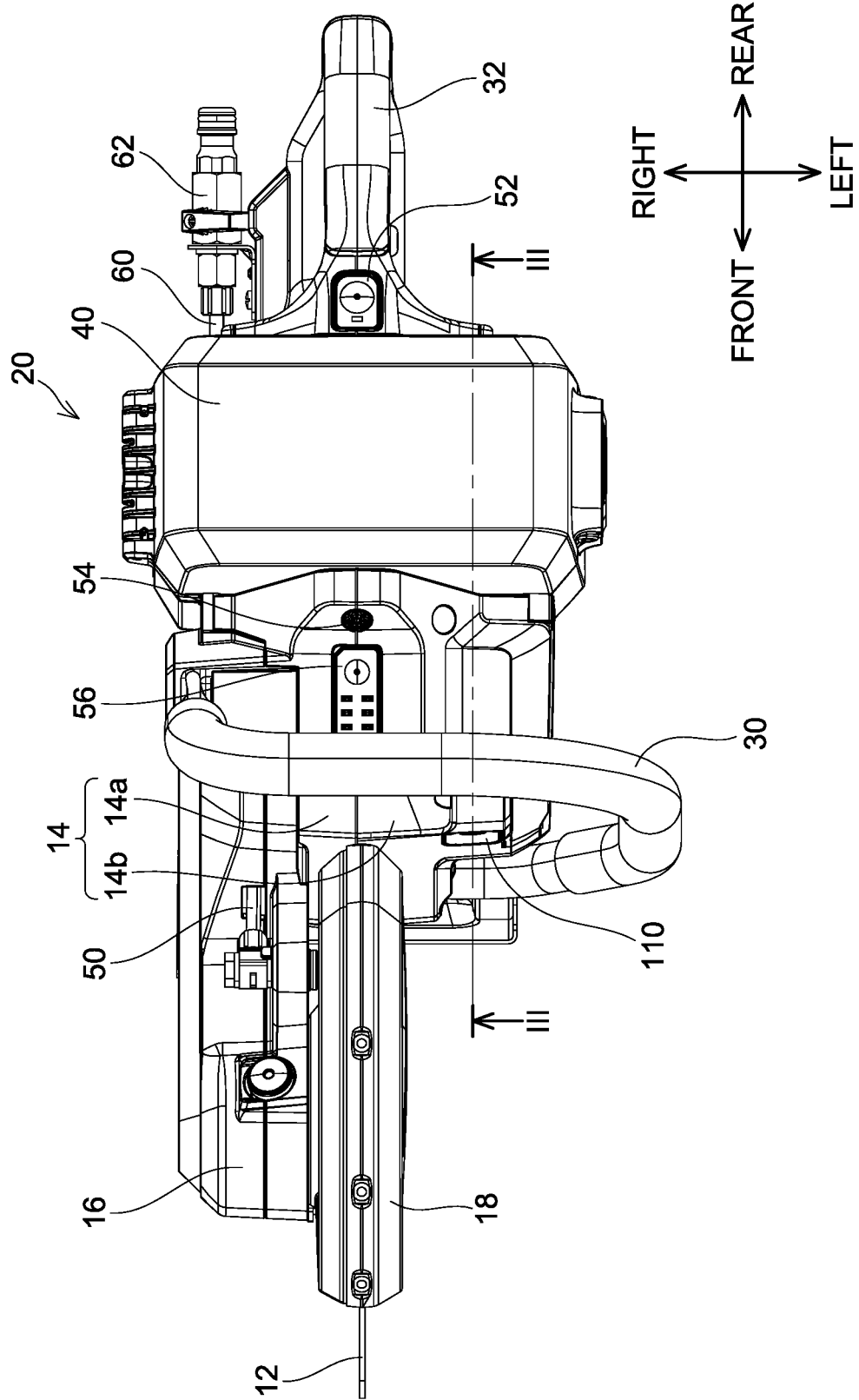
FIG. 2 is a top view of the power cutter 10 of the first embodiment, as viewed from the upper side.

Referring to FIGS. 1 to 5, a power cutter 10 will be described. The power cutter 10 is a handheld power tool and is used to cut objects, mainly such as stone materials and iron materials. As shown in FIG. 1 and FIG. 2, the power cutter 10 comprises a disk blade 12, an outer housing 14, a blade arm 16 constituted of metal, a blade cover 18, and a battery case 20. The outer housing 14 comprises a right outer housing 14a and a left outer housing 14b. The blade arm 16 extends forward from the right outer housing 14a.

The disk blade 12 is a disk-shaped blade and includes a plurality of cutting edges or grinding stones at an outer peripheral edge thereof. The disk blade 12 is detachably attached to the blade arm 16. A rotation shaft of the disk blade 12 extends perpendicular to a longitudinal direction of the blade arm 16 (i.e., in a left-right direction).

The power cutter 10 further comprises the blade cover 18. The blade cover 18 is assembled to the blade arm 16 and covers apart of the disk blade 12. The blade cover 18 prevents dust generated by the disk blade 12 from being scattered toward a user.

The power cutter 10 further comprises a front grip 30 and a rear grip 32. The front grip 30 is disposed at a front portion of the outer housing 14. The rear grip 32 is disposed at the outer housing 14. The rear grip 32 is positioned at a rear portion of the outer housing 14 and extends rearward from the outer housing 14.

Figure 3:
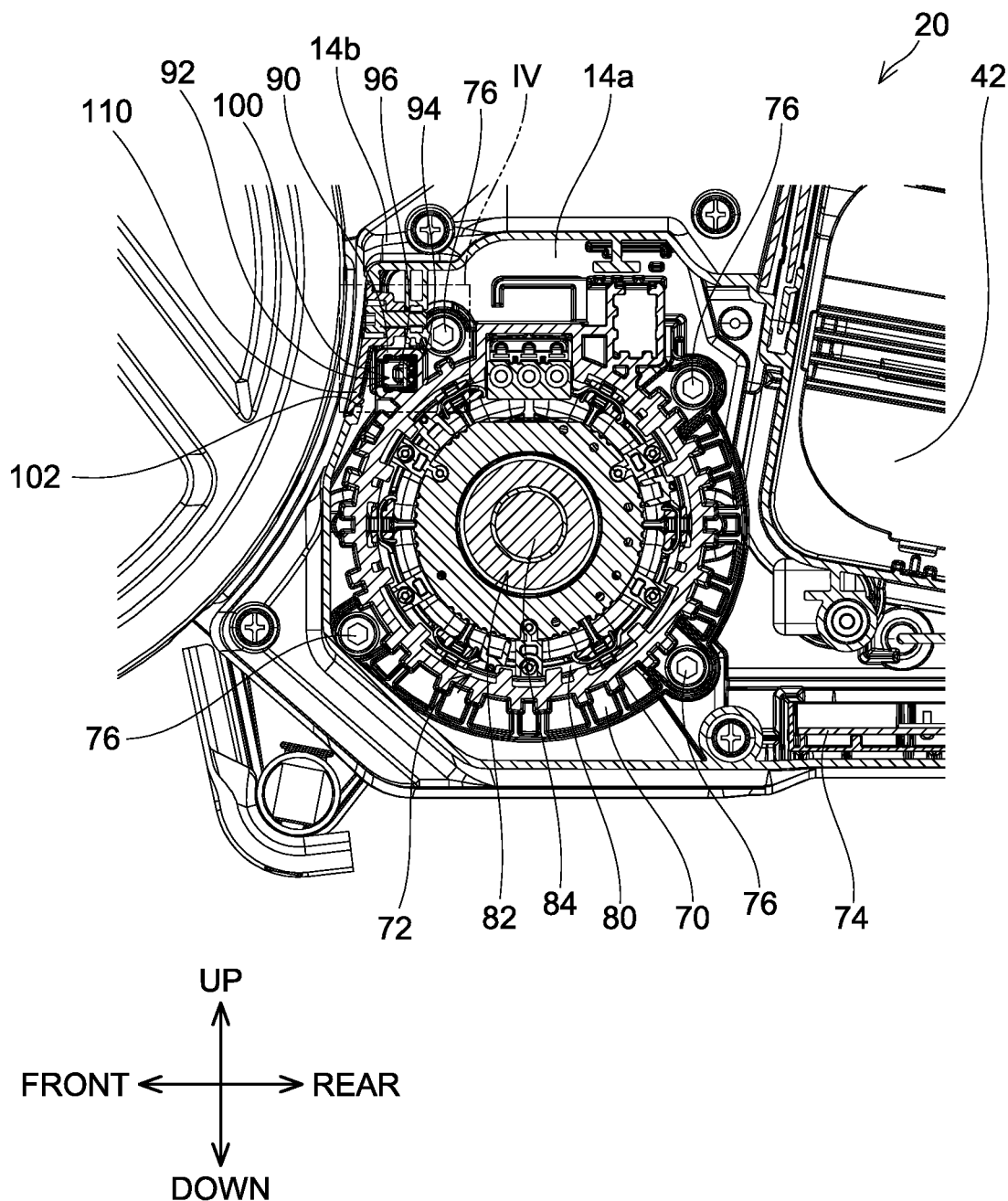
FIG. 3 is a sectional view along a line III-III in FIG. 2.

The battery case 20 is disposed between the front grip 30 and the rear grip 32. The battery case 20 comprises an openable and closable battery cover 40. As shown in FIG. 3, a plurality of battery interfaces (not shown) that detachably receives a plurality of battery packs 42 (see FIG. 5) is disposed in the battery case 20.

As shown in FIG. 1, a main switch 50 is disposed at the rear grip 32. A motor 72 (see FIGS. 3 and 5), which will be described later, drives the disk blade 12 when the user operates the main switch 50. The motor 72 stops driving the disk blade 12 when the user releases the operation on the main switch 50.

The power cutter 10 further comprises a lighting switch 52 for turning on and turning off a lighting apparatus 92 (see FIGS. 3 and 4), which will be described later. The lighting switch 52 is positioned on an upper surface of the rear grip 32 and is configured to be operated while the user is gripping the rear grip 32.

The power cutter 10 further comprises an overload indicator 54 and a battery indicator 56. The overload indicator 54 is disposed at a position that the user can easily see while using the power cutter 10. The battery indicator 56 is a notifier that notifies of the user charge levels of the respective battery packs 42. The battery indicator 56 in this embodiment comprises a plurality of LEDs for each of the battery packs 42 and is configured to change the number of light-emitting LEDs according to the charge level of each battery pack 42.

As shown in FIG. 2, the power cutter 10 further comprises a water-supply hose 60. The water-supply hose 60 is assembled to the outer housing 14 and is configured to supply water to an inside of the blade cover 18. A water-supply connector 62 is disposed at a base end of the water-supply hose 60. The water-supply connector 62 is held by the outer housing 14 and is connected to an external water-supply source, for example, a water faucet, via a hose which is not shown.

As shown in FIG. 3, a motor housing 70, the motor 72, and a control board 74 are housed in the outer housing 14. In this embodiment, the motor housing 70 is attached to the blade arm 16 with bolts 76 that penetrates the right outer housing 14a. According to this configuration, the right outer housing 14a, the blade arm 16, and the motor housing 70 can be assembled in one step. Consequently, the assembly process of the right outer housing 14a, the blade arm 16, and the motor housing 70 can be simplified, compared with assembling each of the blade arm 16 and the motor housing 70 to the right outer housing 14a. Besides, since the motor housing 70 is attached to the blade arm 16 which is constituted of metal, the motor housing 70 can be firmly attached to the blade arm 16. In a variant, the motor housing 70 may be attached to the right outer housing 14a. The motor 72 is housed in the motor housing 70. The motor 72 is an inner-rotor-type motor and comprises a stator 80, a rotor 82, and a motor shaft 84. The motor 72 is connected to the disk blade 12, for example, via a transmission belt (not shown).

The control board 74 comprises, for example, a power conversion circuit and/or a microprocessor. The control board 74 is positioned rearward of the motor housing 70. The control board 74 controls an operation of the motor 72 by controlling electric power supplied from the plurality of battery packs 42 to the motor 72. The disk blade 12 is driven when the motor 72 is driven.

Figure 4:
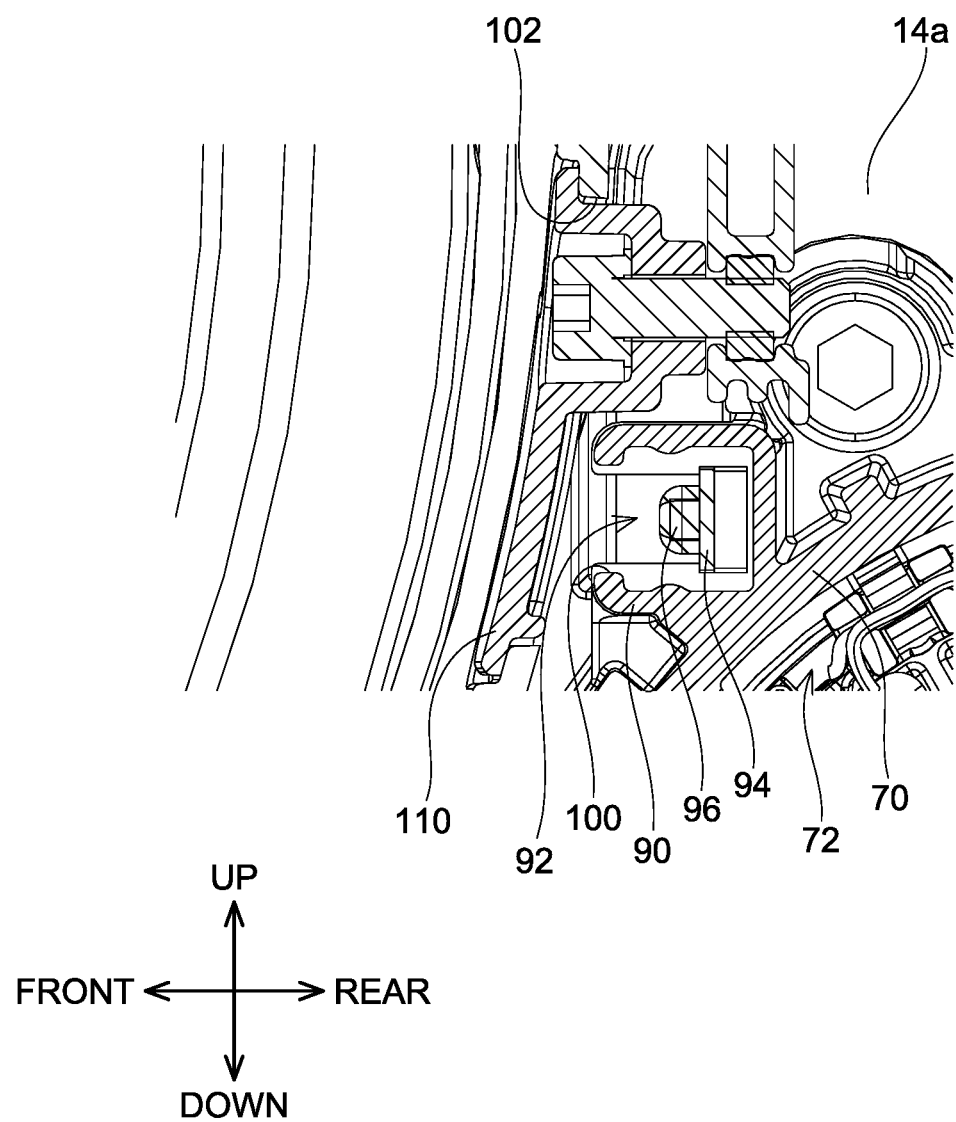
FIG. 4 is an enlarged view of a dashed line IV in FIG. 3.

A lighting housing portion 90 in which the lighting apparatus 92 is housed is disposed at an upper front portion of the motor housing 70. As shown in FIG. 4, the lighting apparatus 92 comprises an LED substrate 94 and an LED 96. The LED substrate 94 is electrically connected to the control board 74. When the lighting switch 52 in FIG. 1 is pressed, electric power is supplied from the control board 74 to the LED substrate 94 and the LED 96 emits light. The illuminance of the LED 96 is 1900 millicandelas [mcd], which is greater than the illuminance of the LEDs disposed at the battery indicator 56. It is desirable that an LED for lighting has the illuminance of, for example, 1000 millicandelas [mcd] or more, and it is more desirable that it has the illuminance of 1500 millicandelas [mcd] or more.

A first opening 100 and a second opening 102 positioned forward of the first opening 100 are disposed forward of the LED 96. The first opening 100 is disposed in the motor housing 70. The second opening 102 is disposed in the left outer housing 14b. A protection member 110 covering the second opening 102 is disposed at the left outer housing 14b. The protection member 110 is constituted of a transparent material. As shown in FIG. 2, in the left-right direction, the protection member 110 is disposed leftward of the disk blade 12 which is disposed at a central portion of the power cutter 10. Consequently, the lighting apparatus 92 disposed rearward of the protection member 110 is disposed leftward of the disk blade 12 as well. Light emitted from the LED 96 is outputted ahead of the power cutter 10, that is, toward the disk blade 12, via the first opening 100, the second opening 102, and the protection member 110.

As above and as shown in FIGS. 1 to 5, the power cutter 10 of one embodiment comprises the disk blade 12; the motor 72 configured to drive the disk blade 12; the motor housing 70 covering at least a part of the motor 72; the outer housing 14 covering at least a part of the motor 72 and at least a part of the motor housing 70; and the lighting apparatus 92 disposed at the lighting housing portion 90, which is covered by the outer housing 14, in the motor housing 70. The outer housing 14 comprises the second opening 102 at a part of the outer housing 14 that faces the lighting apparatus 92 and the second opening 102 allows light emitted from the lighting apparatus 92 to pass therethrough. According to this configuration, even in cases where disposing the lighting apparatus 92 at the outer housing 14 is limited, the lighting apparatus 92 can be disposed at a suitable position. Consequently, the degree of freedom for a layout of the lighting apparatus 92 in the power cutter 10 can be enhanced.

In the power cutter 10 of one embodiment, as shown in FIGS. 3 and 4, the protection member 110 is disposed at the second opening 102, and the protection member 110 covers the second opening 102 and allows the light emitted from the lighting apparatus 92 to pass therethrough. According to this configuration, extraneous matters can be prevented from passing through the second opening 102 of the outer housing 14. Consequently, intrusion of extraneous matters into the outer housing 14 can be prevented.

In the power cutter 10 of one embodiment, as shown in FIGS. 3 and 4, the light emitted from the lighting apparatus 92 is emitted toward the disk blade 12. According to this configuration, an operator is able to properly know the state of the disk blade 12 owing to the light emitted from the lighting apparatus 92.

In the power cutter 10 of one embodiment, as shown in FIGS. 1 to 5, the power cutter 10 comprises the battery packs 42 detachably attached to the outer housing 14. The motor 72 and the lighting apparatus 92 are configured to operate with electric power supplied from the battery packs 42. According to this configuration, the power cutter 10 may not have a power cable, etc. to receive electric power from an external. Hence, the power cable will not be an obstruction while the operator is using the power cutter 10. Consequently, the operational convenience can be enhanced.

Figure 5:
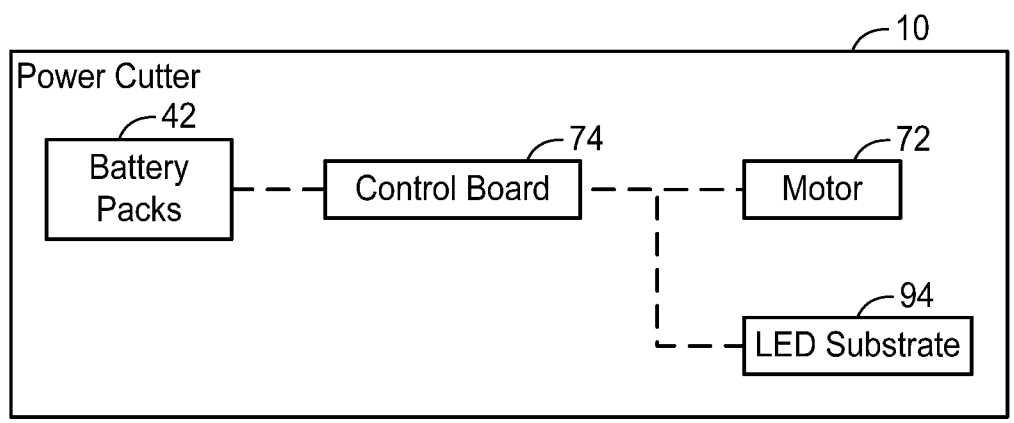
FIG. 5 is a diagram showing an electrical configuration of the power cutter 10 of the first embodiment.

As shown in FIG. 5, the power cutter 10 of one embodiment comprises the control board 74 configured to control the operations of the motor 72 and the lighting apparatus 92. According to this configuration, the operation of the lighting apparatus 92 can be properly controlled by using the control board 74 which controls the operation of the motor 72.

(Correspondence Relationships)

The disk blade 12 is an example of "working part". The lighting apparatus 92 is an example of "light emitter". The second opening 102 is an example of "opening allows the light emitted from the light emitter to pass through the opening". The control board 74 is an example of "controller unit".

Second Embodiment

Figure 6:
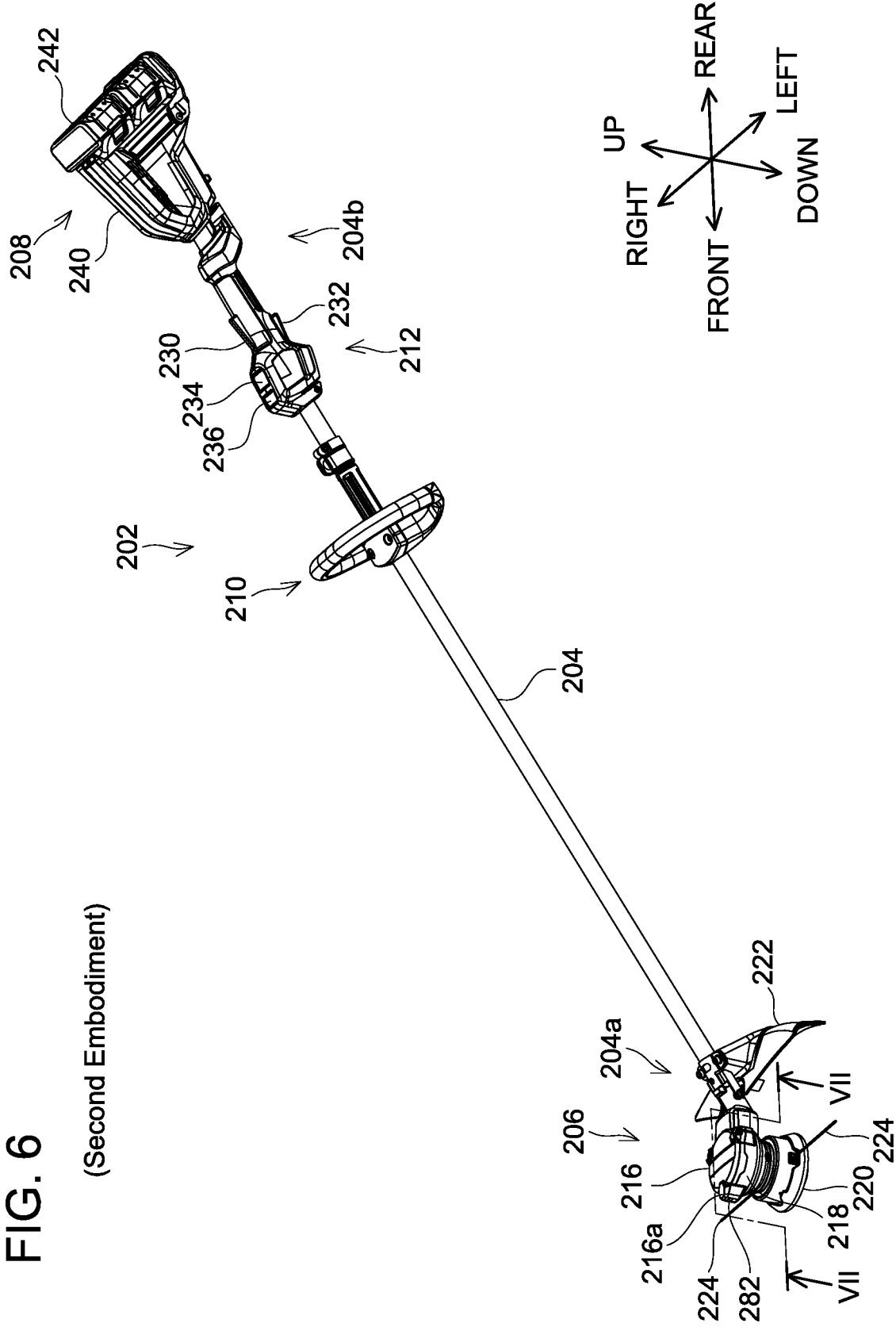
FIG. 6 is a perspective view of a string trimmer 202 of a second embodiment.
Figure 7:
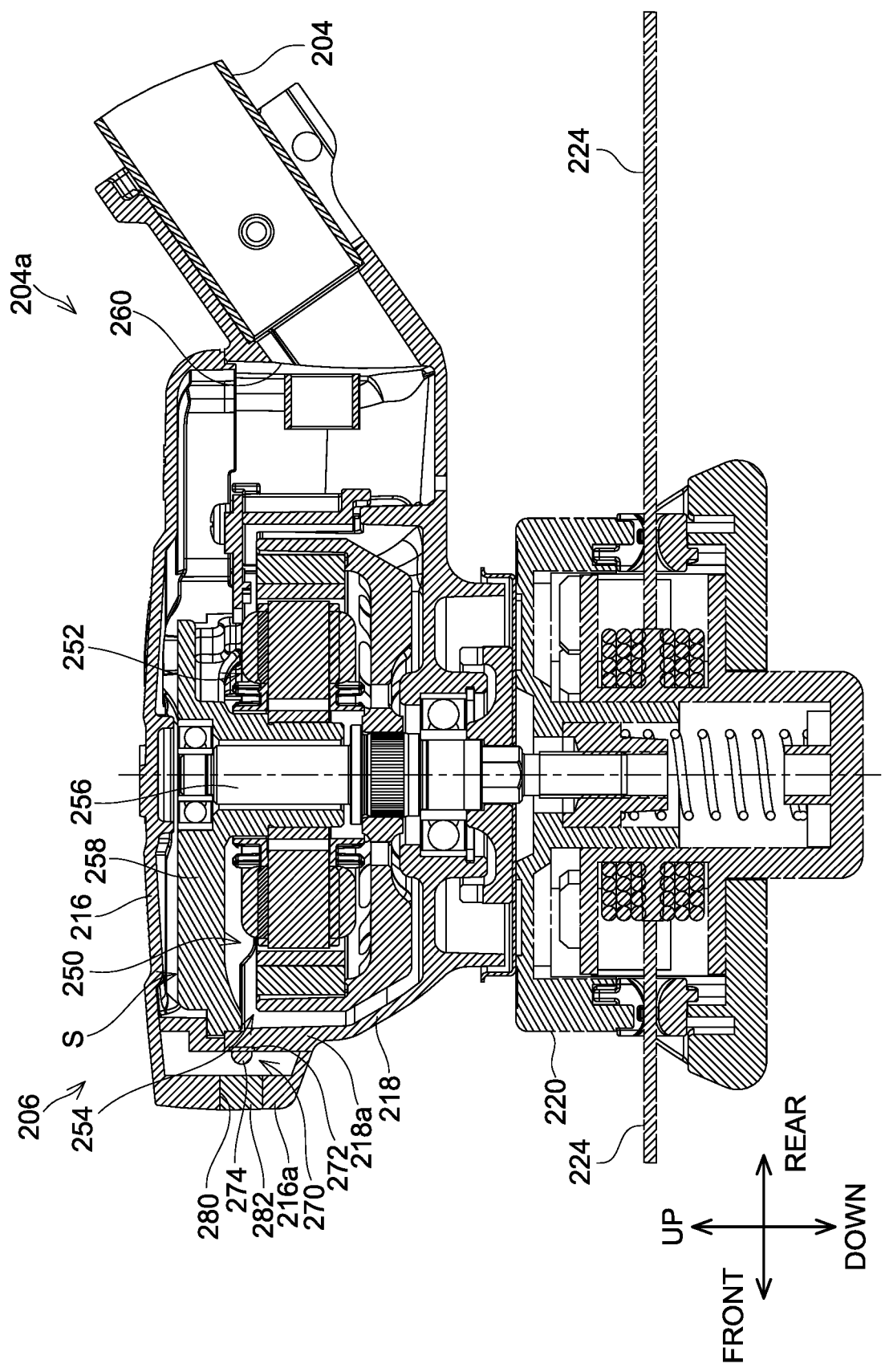
FIG. 7 is a sectional view along a line VII-VII in FIG. 6.
Figure 8:
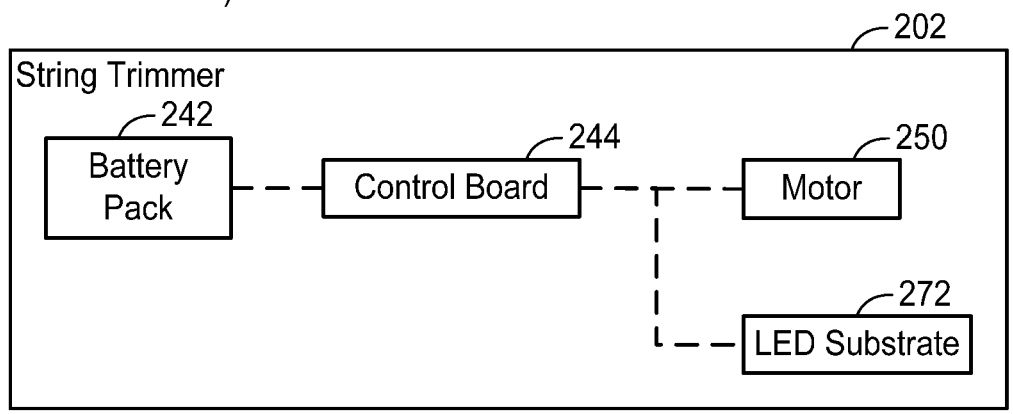
FIG. 8 is a diagram showing an electrical configuration of the string trimmer 202 of the second embodiment.

Referring to FIGS. 6 to 8, a string trimmer 202 of this embodiment will be described. As shown in FIG. 6, the string trimmer 202 comprises a support rod 204; a front-end unit 206 disposed at a front end 204a of the support rod 204; a rear-end unit 208 disposed at a rear end 204b of the support rod 204; a loop handle 210 disposed at an intermediate portion of the support rod 204; and a grip 212 disposed between the loop handle 210 and the rear-end unit 208 on the support rod 204. The support rod 204 has a shape of a hollow pipe and linearly extends from the front end 204a to the rear end 204b.

The front-end unit 206 comprises an outer housing 216, a motor housing 218, a cord holder 220, and a safety cover 222. As shown in FIGS. 6 and 7, the outer housing 216 does not cover the entirety of the motor housing 218, but covers an upper portion and a front portion 218a of the motor housing 218. The cord holder 220 holds a string-shaped cutter cord 224. A tip of the cutter cord 224 is drawn out from the cord holder 220 and rotates together with the cord holder 220.

The loop handle 210 has a shape of a hollow pipe and is formed in a loop shape that expands upward and sideways from the support rod 204. The loop handle 210 is fixed to the support rod 204.

The grip 212 is formed to cover an outer periphery of the support rod 204. The grip 212 comprises a lock-off lever 230 disposed on an upper surface thereof and a trigger switch 232 disposed on a lower surface thereof. The trigger switch 232 is a switch for driving a motor 250 (see FIG. 8), which will be described later. Supply of electric power to the motor 250 is cut off when the trigger switch 232 is not pushed in. Electric power is supplied to the motor 250 when the trigger switch 232 is pushed in. The lock-off lever 230 is a lever for restricting the push-in operation on the trigger switch 232 and releasing the restriction. The push-in operation on the trigger switch 232 is restricted when the lock-off lever 230 is not pushed in. The restriction of the push-in operation on the trigger switch 232 is released when the lock-off lever 230 is pushed in.

An operation panel 234 and a display panel 236 are disposed on the upper surface of the grip 212 and forward of the lock-off lever 230. The operator can switch between driving and stopping the motor 250, switch between on and off of an LED 274 (see FIG. 7), which will be described later, etc. by operating the operation panel 234. A display lamp (not shown) that displays the operation state of the motor 250 is attached to the display panel 236.

The rear-end unit 208 comprises a rear-end housing 240 in which a control board 244 (see FIG. 8) is housed and a battery pack 242 detachably attached to the rear-end housing 240.

As shown in FIG. 7, an upper portion of the motor housing 218 of the front-end unit 206 has an opening. The outer housing 216 covers the opening in the upper portion of the motor housing 218. Besides, a cover portion 216a of the outer housing 216 covers an outer periphery of the front portion 218a of the motor housing 218.

The motor 250 is of outer-rotor-type and is housed in a space S that is defined by the outer housing 216 and the motor housing 218. The motor 250 comprises a stator 252, a rotor 254, and a motor shaft 256. The motor 250 is electrically connected to the control board 244 housed in the rear-end housing 240 via electric wiring (not shown). The electric wiring extends from the motor 250 in the space S to the control board 244 housed in the rear-end housing 240, via a first opening 260 disposed rearward of the outer housing 216 and the motor housing 218 and an inside of the support rod 204.

The stator 252 is fitted to a stator base 258. The stator base 258 is fixed to the outer housing 216 and the motor housing 218, so that the stator 252 is fixed to the outer housing 216 and the motor housing 218.

A lighting apparatus 270 is disposed at the front portion 218a of the motor housing 218. The lighting apparatus 270 comprises an LED substrate 272 and the LED 274. The LED substrate 272 is electrically connected to the control board 244 housed in the rear-end housing 240 by electric wiring (not shown). The electric wiring extends from the LED substrate 272 disposed at the front portion 218a of the motor housing 218 to the control board 244 housed in the rear-end housing 240, via the space S, the first opening 260, and the inside of the support rod 204. When the operation panel 234 in FIG. 6 is operated, electric power is supplied from the control board 244 to the LED substrate 272 and the LED 274 emits light.

A second opening 280 is disposed at a part of the cover portion 216a of the outer housing 216 that faces the LED 274 and the second opening 280 penetrates the cover portion 216a in a front-rear direction. A protection member 282 is attached to the second opening 280. The protection member 282 is constituted of a transparent material. Light emitted from the LED 274 disposed at the front portion 218a of the motor housing 218 passes through the protection member 282 and is outputted ahead of the string trimmer 202.

As above and as shown in FIGS. 6 to 8, the string trimmer 202 of one embodiment comprises the cutter cord 224; the motor 250 configured to drive the cutter cord 224; the motor housing 218 covering at least a part of the motor 250; the outer housing 216 covering at least a part of the motor 250 and at least a part of the motor housing 218; and the lighting apparatus 270 disposed at a part of the motor housing 218 that is covered by the outer housing 216. The outer housing 216 comprises the second opening 280 at a part thereof that faces the lighting apparatus 270 and the second opening 280 allows light emitted from the lighting apparatus 270 to pass therethrough. According to this configuration, even in cases where disposing the lighting apparatus 270 at the outer housing 216 is difficult, the lighting apparatus 270 can be disposed at a suitable place. Consequently, the degree of freedom for a layout of the lighting apparatus 270 in the string trimmer 202 can be enhanced.

(Correspondence Relationships)

The cutter cord 224 is an example of "working part". The lighting apparatus 270 is an example of "light emitter". The second opening 280 is an example of "opening allows the light emitted from the light emitter to pass therethrough". The control board 244 is an example of "controller unit".

While specific examples of the present disclosure have been described above in detail, these examples are merely illustrative and place no limitation on the scope of the patent claims. The technology described in the patent claims also encompasses various changes and modifications to the specific examples described above.

(First Variant) The "working machine" is not limited to a power cutter or a string trimmer, and may be a blower, a pressure washer, an electric tool, or the like that comprises a motor housing and an outer housing. The electric tool is, for example, an electric drill.

(Second Variant) The usage of the "light emitter" is not limited to lighting, and may be used for example, for indicating the operation state of the working machine.

(Third Variant) In each embodiment, the protection member may not be disposed at the second opening of the outer housing. In another variant, the lighting apparatus disposed at the motor housing may project toward the outer housing and the second opening may be closed by the lighting apparatus.

(Fourth Variant) In each embodiment, the power cutter 10 and the string trimmer 202 may not comprise the battery pack(s). For example, the power cutter 10 and the string trimmer 202 may comprise a power cable to receive electric power from an external.

(Fifth Variant) In each embodiment, the type of the motor is not limited. For example, the motor may be a brushed motor or a brushless motor. Besides, the motor may be an outer-rotor-type motor or an inner-rotor-type motor.

The technical elements explained in the present description or drawings provide technical utility either independently or through various combinations. The present disclosure is not limited to the combinations recited in the claims as originally filed. Further, the purpose of the examples illustrated by the present description or drawings is to satisfy multiple objectives simultaneously, and satisfying any one of those objectives gives technical utility to the present disclosure.

The invention claimed is:

1. A working machine comprising:
   a working part;
   a motor configured to drive the working part;
   a motor housing covering at least a part of the motor;
   an outer housing covering at least a part of the motor and covering at least a part of the motor housing, wherein the motor housing and the outer housing are separate parts; and
   a light emitter disposed at a part of the motor housing ci) that covers the motor and (ii) that is covered by the outer housing, wherein the light emitter is oriented to face an inner surface of the outer housing,
   wherein
   the outer housing comprises an opening at a part of the outer housing that faces the light emitter, wherein the opening of the outer housing allows light emitted from the light emitter to pass through the opening of the outer housing.

2. The working machine according to claim 1, wherein the motor housing is housed inside the outer housing,
   a covering member is disposed at the opening of the outer housing, wherein the covering member is formed of a transparent material, and
   the covering member covers the opening and allows the light, which is emitted from the light emitter disposed at the motor housing, to pass through the covering member of the outer housing.

3. The working machine according to claim 1, wherein the opening of the outer housing is provided at a location that faces the working part, and
   the light emitted from the light emitter disposed at the motor housing is emitted through the opening and toward the working part.

4. The working machine according to claim 1, further comprising a battery pack detachably attached to the outer housing, and
   wherein the motor and the light emitter are configured to operate with electric power supplied from the battery pack.

5. The working machine according to claim 1, further comprising a controller unit configured to control operations of the motor and the light emitter.

6. A working machine comprising:
   a working part;
   a motor configured to drive the working part;
   a motor housing covering at least a part of the motor;
   an outer housing covering at least a part of the motor and covering at least a part of the motor housing, wherein the motor housing and the outer housing are separate parts; and
   a light emitter disposed at a part of the motor housing ci) that covers the motor and (ii) that is covered by the outer housing, wherein the light emitter is oriented to face an inner surface of the outer housing,
   wherein
   the outer housing comprises an opening at a part of the outer housing that faces the light emitter, wherein the opening of the outer housing allows light emitted from the light emitter to pass through the opening of the outer housing,
   wherein the motor housing is housed inside the outer housing,
   wherein a covering member is disposed at the opening of the outer housing, wherein the covering member is formed of a transparent material, and
   the covering member covers the opening and allows the light, which is emitted from the light emitter disposed at the motor housing, to pass through the covering member of the outer housing,
   wherein the opening of the outer housing is provided at a location that faces the working part, and
   wherein the light emitted from the light emitter disposed at the motor housing is emitted through the opening and toward the working part,
   wherein the working machine further comprises:
   a battery pack detachably attached to the outer housing, and
   wherein the motor and the light emitter are configured to operate with electric power supplied from the battery pack;
   wherein the working machine further comprises a controller unit configured to control operations of the motor and the light emitter.

* * * * *